(12) United States Patent
Tsutazawa et al.

(10) Patent No.: US 7,814,120 B2
(45) Date of Patent: Oct. 12, 2010

(54) LIST MANAGEMENT SERVER FOR MANAGING UPDATING OF LIST BY THIRD-PARTY TERMINAL, LIST MANAGEMENT SYSTEM, LIST MANAGING METHOD, AND PROGRAM

(75) Inventors: Natsuko Tsutazawa, Tokyo (JP); Naoko Ito, Tokyo (JP); Masafumi Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1059 days.

(21) Appl. No.: 11/324,343

(22) Filed: Jan. 4, 2006

(65) Prior Publication Data

US 2006/0149740 A1   Jul. 6, 2006

(30) Foreign Application Priority Data

Jan. 6, 2005   (JP) ............................. 2005-001347

(51) Int. Cl.
*G06F 17/00* (2006.01)
*G06F 17/30* (2006.01)

(52) U.S. Cl. ..................... 707/783; 707/609; 707/705; 707/785; 707/826

(58) Field of Classification Search ................ 707/1–2, 707/9, 10, 100, 102–103 R, 200, 203, 204–205, 707/609, 705–709, 732, 781–789, 826–827; 709/218–225; 713/153; 705/1, 26; 715/743–747
See application file for complete search history.

(56) References Cited

U.S. PATENT DOCUMENTS

| | | | | |
|---|---|---|---|---|
| 6,587,691 | B1* | 7/2003 | Granstam et al. | ......... 455/456.1 |
| 2002/0023131 | A1* | 2/2002 | Wu et al. | .................... 709/205 |
| 2002/0035605 | A1* | 3/2002 | McDowell et al. | .......... 709/206 |
| 2002/0065718 | A1* | 5/2002 | Otani et al. | ................... 705/14 |
| 2003/0004743 | A1 | 1/2003 | Callegari | |
| 2003/0065721 | A1* | 4/2003 | Roskind | ...................... 709/204 |
| 2003/0135629 | A1* | 7/2003 | Sasaki et al. | ................ 709/229 |
| 2003/0204720 | A1* | 10/2003 | Schoen et al. | ............... 713/153 |

(Continued)

FOREIGN PATENT DOCUMENTS

EP   1 587 239 A1   10/2005

(Continued)

OTHER PUBLICATIONS

List Management and Do-not-Disturb V2.0.6 (Jun. 2006), Technical Specification, Push to Talk over Cellular (PoC); List Management and Do-not-Disturb; PoC Release 2.0, 57 pages.*

(Continued)

*Primary Examiner*—Srirama Channavajjala
(74) *Attorney, Agent, or Firm*—Dickstein Shapiro LLP

(57) ABSTRACT

A buddy list manager stores a buddy list sent from a receiver terminal and manages the buddy list. A controller accepts an updating request and identifying information of a third party terminal from the third party terminal. When the controller accepts the updating request and the identifying information from the third party terminal, the controller determines whether the third party has an updating authority for updating the buddy list or not, using the identifying information. If the controller judges that the third party has an updating authority for updating the buddy list, then the controller permits the third party terminal to update the buddy list.

16 Claims, 10 Drawing Sheets

U.S. PATENT DOCUMENTS

| | | | |
|---|---|---|---|
| 2004/0003037 A1* | 1/2004 | Fujimoto et al. | 709/203 |
| 2004/0044536 A1* | 3/2004 | Fitzpatrick et al. | 705/1 |
| 2004/0062383 A1 | 4/2004 | Sylvain | |
| 2004/0122822 A1* | 6/2004 | Thompson et al. | 707/100 |
| 2004/0196315 A1* | 10/2004 | Swearingen et al. | 345/804 |
| 2004/0199550 A1* | 10/2004 | Ito et al. | 707/201 |
| 2005/0021780 A1* | 1/2005 | Beyda | 709/229 |
| 2005/0213563 A1 | 9/2005 | Shaffer et al. | |
| 2005/0216300 A1* | 9/2005 | Appelman et al. | 705/1 |
| 2005/0228882 A1* | 10/2005 | Watanabe et al. | 709/224 |
| 2006/0224362 A1* | 10/2006 | Ito | 702/188 |
| 2007/0006308 A1* | 1/2007 | Desouza et al. | 726/24 |
| 2007/0233697 A1* | 10/2007 | Takenouchi et al. | 707/10 |
| 2008/0133677 A1* | 6/2008 | Pattabhiraman et al. | 709/206 |
| 2009/0043843 A1* | 2/2009 | Milewski et al. | 709/204 |
| 2010/0125580 A1* | 5/2010 | Westen et al. | 707/737 |

FOREIGN PATENT DOCUMENTS

| | | |
|---|---|---|
| JP | 05-134989 | 6/1993 |
| JP | 2002-091893 | 3/2002 |
| JP | 2003-296525 | 10/2003 |
| JP | 2003-308420 | 10/2003 |
| JP | 2004-171071 A | 6/2004 |
| JP | 2004-228833 | 8/2004 |
| JP | 2004-246397 | 9/2004 |
| WO | WO 03/003694 A2 | 1/2003 |
| WO | WO 2004/030257 * | 4/2004 |
| WO | WO 2005/078998 A1 | 8/2005 |
| WO | WO 2007/124160 * | 11/2007 |

OTHER PUBLICATIONS

John Page, et al. "A Buddy Model of Security for Mobile Agent Communities Operating in Pervasive Scenarios",2004, Australian Computer Society, Inc., 9 pages.*

3GPP: "3rd Generation Partnership Project; Technical Specification Group Services and System Aspects; Presence Service; Architecture and Functional Description (Release 6)", 3GPP TS 23.141 V0.0.0, XP002243553 (Jun. 2002).

* cited by examiner

5c1 UPDATING AUTHORITY DATABASE

| IDENTIFYING INFORMATION (5c1a) | UPDATING YES/NO (5c1b) |
|---|---|
| stab | YES |
| abcd | NO |
| ⋮ | ⋮ |

Fig. 4

5c1 UPDATING AUTHORITY DATABASE

| BUDDY LIST | IDENTIFYING INFORMATION | UPDATING YES/NO |
|---|---|---|
| W1-BL | stab | YES |
| | abcd | NO |
| | ⋮ | ⋮ |
| W2-BL | stab | NO |
| | abcd | YES |
| | ⋮ | ⋮ |
| ⋮ | ⋮ | ⋮ |

Columns: 5c1c, 5c1a, 5c1b

Fig. 6

5c1 UPDATING AUTHORITY DATABASE

| BUDDY (5c1d) | IDENTIFYING INFORMATION (5c1a) | UPDATING YES/NO (5c1b) |
|---|---|---|
| W1-B1 | stab | YES |
|  | abcd | YES |
|  | ⋮ | ⋮ |
| W1-B2 | stab | NO |
|  | abcd | YES |
|  | ⋮ | ⋮ |
| ⋮ | ⋮ | ⋮ |

Fig. 7

LIST MANAGEMENT SERVER FOR MANAGING UPDATING OF LIST BY THIRD-PARTY TERMINAL, LIST MANAGEMENT SYSTEM, LIST MANAGING METHOD, AND PROGRAM

BACKGROUND OF THE INVENTION

1. Field of the Invention

The present invention relates to a list management server for managing the updating of a list of information provider terminals which are monitored by receiver terminals, a list management system, a list managing method, and a program, and more particularly to a list management server for managing the updating of a list by a third-party terminal, a list management system, a list managing method, and a program. The list is used to distribute information owned by information provider terminals to receiver terminals.

2. Description of the Related Art

Heretofore, there have been known presence systems for managing user statuses. For example, JP-A-2004-246397 discloses a presence system employing a buddy list. The buddy list represents a list of persons whose statuses are to be monitored.

A presence system is a term describing a presence service that is supported by a system for managing the state of each user. The basic architecture of the presence system is described by RFC (Request For Comment) 2778.

A presence system includes a presentity, a watcher, and a presence service.

The presentity holds the status of a status information provider, i.e., the presence information of a status information provider. Specifically, the presentity is a terminal device for holding the presence information of a status information provider.

The watcher provides the presence information held by a presentity to a status information receiver. Specifically, the watcher is a terminal device for accepting the presence information owned by a presentity.

If there is a plurality of presentities, a watcher does not accept the presence information of all the presentities, but accepts the presence information of the presentity that the watcher has designated.

The presentity that the watcher has designated is referred to as a buddy (an entity to be monitored). The watcher generates a buddy list of buddies (an information monitored entity list) in order to acquire the presence information of buddies.

The presence service distributes the presence information of a buddy represented by a buddy list to a watcher.

JP-A-2002-91893 discloses a workflow system for allowing a plurality of terminal devices interconnected by a network to sequentially update a single electronic file.

According to the disclosed workflow system, when a terminal device finishes updating the electronic file, it hands over its authority to update the electronic file to another terminal device.

A terminal device can recover the authority to update the electronic file that the terminal device has lost. The terminal device can recover the updating authority even in the absence of the consent from the user of the terminal device that is currently holding the updating authority.

Specifically, the terminal device can take back the updating authority by issuing a request to recover the updating authority.

In an ordinary presence system (presence service), only a watcher (in this case, an information receiver) and a presence service administrator (hereinafter referred to simply as "administrator") have an authority to update the buddy list of the watcher.

If a third party which is neither the watcher nor the administrator wants to update the buddy list of the watcher, then the third party has to request the watcher or the administrator to update the buddy list, and the watcher or the administrator has to update the buddy list according to the request.

Consequently, unless the watcher or the administrator updates the buddy list of the watcher, the third party cannot update the buddy list.

When the watcher or the administrator is requested by the third party to update the buddy list, the watcher or the administrator needs to take the trouble of updating the buddy list according to the request.

JP-A-2002-91893 discloses a workflow system that allows a terminal device that is free of the updating authority to acquire the updating authority by issuing a request to recover the updating authority.

According to the disclosed workflow system, the updating authority is transferred to the terminal device that has issued the request to recover the updating authority even if there is no consent from the user of the terminal device that is currently holding the updating authority.

Consequently, if the updating authority transference technology is applied to a presence system (presence service), then a malicious third party may rewrite the buddy list for unauthorized acquisition of the presence information of a certain buddy.

SUMMARY OF THE INVENTION

It is an object of the present invention to provide a list management server, a list management system, a list managing method, and a program that are capable of reducing the burden on a watcher or an administrator in updating a list and also of preventing the list from being illegally rewritten.

To achieve the above object, a list management server or a list management system according to the present invention comprises a list management server for updating a list that represents an information provider terminal that is monitored by a receiver terminal, based on an updating request that is sent through a communication link from a third party terminal. The list management server includes a list storage unit and a controller.

The list is used to distribute information from the information provider terminal to the receiver terminal.

The third party terminal is different from both the receiver terminal and an administrator terminal of an administrator of the list.

The list storage unit stores the list.

The controller accepts the updating request and identifying information for identifying a user of the third party terminal from the third party terminal, and determines whether the user has an updating authority to update the list or not, using the identifying information.

If the controller judges that the user has an updating authority to update the list, the controller permits the third party terminal to update the list.

With the above arrangement, the third party terminal, which is used by the user having an authority to update the list, is able to update the list. Consequently, the possibility that the list may be illegally rewritten is lowered.

Furthermore, the third party terminal can update the list. It is thus possible to reduce the burden on a watcher (receiver) or the administrator in updating the list.

The list management server should preferably be arranged as follows:

The controller comprises an authority storage unit and an updating permission unit.

The authority storage unit stores specifying information for specifying an authority holder. The authority holder has an updating authority for updating the list stored in the list storage unit and is different from the receiver and the administrator.

When the updating permission unit accepts the updating request and the identifying information from the third party terminal, the updating permission unit determines whether the user has the updating authority or not based on the identifying information and the specifying information stored in the authority storage unit.

The updating permission unit permits the third party terminal to update the list if the updating permission unit judges that the user has the updating authority.

With the above arrangement, the authority storage unit stores specifying information for specifying an authority holder. Therefore, it is possible to determine whether the third party terminal can update the list or not based on the specifying information stored in the authority storage unit.

The authority storage unit should preferably stores, as the specifying information, updating yes/no information that indicates whether each user who can use the list management server has the updating authority.

The above arrangement allows an authority holder who is capable of updating the list to be set with respect to each user.

The list management server should also preferably be arranged as follows:

The list storage unit stores lists sent from a plurality of respective receiver terminals.

The authority storage unit stores specifying information for specifying an authority holder having an updating authority for updating each of the lists.

The updating permission unit accepts an updating request for updating either one of the lists and the identifying information from the third party terminal, and determines whether the user has an updating authority for updating the list which is designated by the updating request or not based on the identifying information and the specifying information of the list which is designated by the updating request.

The updating permission unit permits the third party terminal to update the list if the updating permission unit judges that the user has the updating authority.

The above arrangement allows an authority holder who is capable of updating the list to be set with respect to each list.

The list management server should further preferably be arranged as follows:

The authority storage unit stores specifying information for specifying an authority holder that has an updating authority for updating each information provider terminal in the list.

The updating permission unit accepts the updating request and the identifying information from the third party terminal, and determines whether the user has an updating authority for updating the each information provider terminal in the list or not based on the identifying information and the specifying information stored in the authority storage unit.

The updating permission unit permits the third party terminal to update the information provider terminal in the list if the updating permission unit judges that the user has the updating authority for updating the information provider terminal.

The above arrangement makes it possible to set an authority holder who is capable of updating the list with respect to each information provider terminal in the list.

Preferably, the specifying information may comprise a condition for specifying the authority holder.

Preferably, the specifying information may comprise a list for specifying the authority holder.

Preferably, the specifying information may represent the authority holder.

Preferably, the specifying information may represent an updating rejected person who is denied updating of the list.

Preferably, the specifying information may represent the authority holder and an updating rejected person who is denied updating of the list.

The list management server should further preferably be arranged as follows:

The updating permission unit determines whether the user has the updating authority for updating the list based on the identifying information of the user and the specifying information stored in the authority storage unit.

If the updating permission unit is unable to determine whether the user has the updating authority for updating the list, the updating permission unit asks an authorized person terminal that is used by an authorized person having an updating authority for updating the list to inquire if the user is permitted to update the list.

The updating permission unit determines whether the user has the updating authority for updating the list based on an answer to the inquiry.

With the above arrangement, it is possible to manage the updating of the list by the third party with high accuracy.

The list management server should further preferably be arranged as follows:

The authority storage unit stores first specifying information, second specifying information, and third specifying information.

The first specifying information indicates whether each user who is capable of using the list management server has the updating authority for updating the list.

The second specifying information specifies an authority holder having an updating authority for updating each of lists.

The third specifying information specifies an authority holder having an updating authority for updating each of information provider terminals in the list.

The updating permission unit selects either one of the first specifying information, the second specifying information, and the third specifying information depending on the updating request from the third party terminal.

The above arrangement allows the list management server to respond to various updating requests from the third party terminal.

The list management server should further preferably be arranged as follows:

The controller comprises a confirmation unit and an updating permission unit.

The confirmation unit accepts the updating request and the identifying information, and asks the receiver terminal or the administrator terminal to inquire if the user who is identified by the identifying information is permitted to update the list, and accepts an answer to the inquiry.

The updating permission unit determines whether that the user has an updating authority for updating the list based on the answer accepted by the confirmation unit.

The updating permission unit permits the third party terminal to update the list if the updating permission unit judges that the user has an updating authority for updating the list.

With the above arrangement, the receiver or the administrator manages the updating of the list. Therefore, it is possible to prevent the list from being illegally rewritten.

The list management server should further preferably be arranged as follows:

When the controller accepts the updating request and an updating certificate that represents an updating authority for updating the list, the controller inquires the validity of the updating certificate of a certificate issuing unit for determining the validity of the updating certificate.

The controller determines whether the user has an updating authority for updating the list based on an answer to the inquiry.

With the above arrangement, it is possible to determine whether the user of the third party terminal has an updating authority for updating the list based on the updating certificate.

The above and other objects, features, and advantages of the present invention will become apparent from the following description with reference to the accompanying drawings which illustrate examples of the present invention.

BRIEF DESCRIPTION OF THE DRAWINGS

FIG. 4 is a diagram showing an example of data stored in updating authority database 5c1;

FIG. 6 is a diagram showing another example of data stored in updating authority database 5c1;

FIG. 7 is a diagram showing still another example of data stored in updating authority database 5c1;

DETAILED DESCRIPTION OF THE PREFERRED EMBODIMENTS

A presence system according to a first embodiment of the present invention will be described below.

Figure 1:
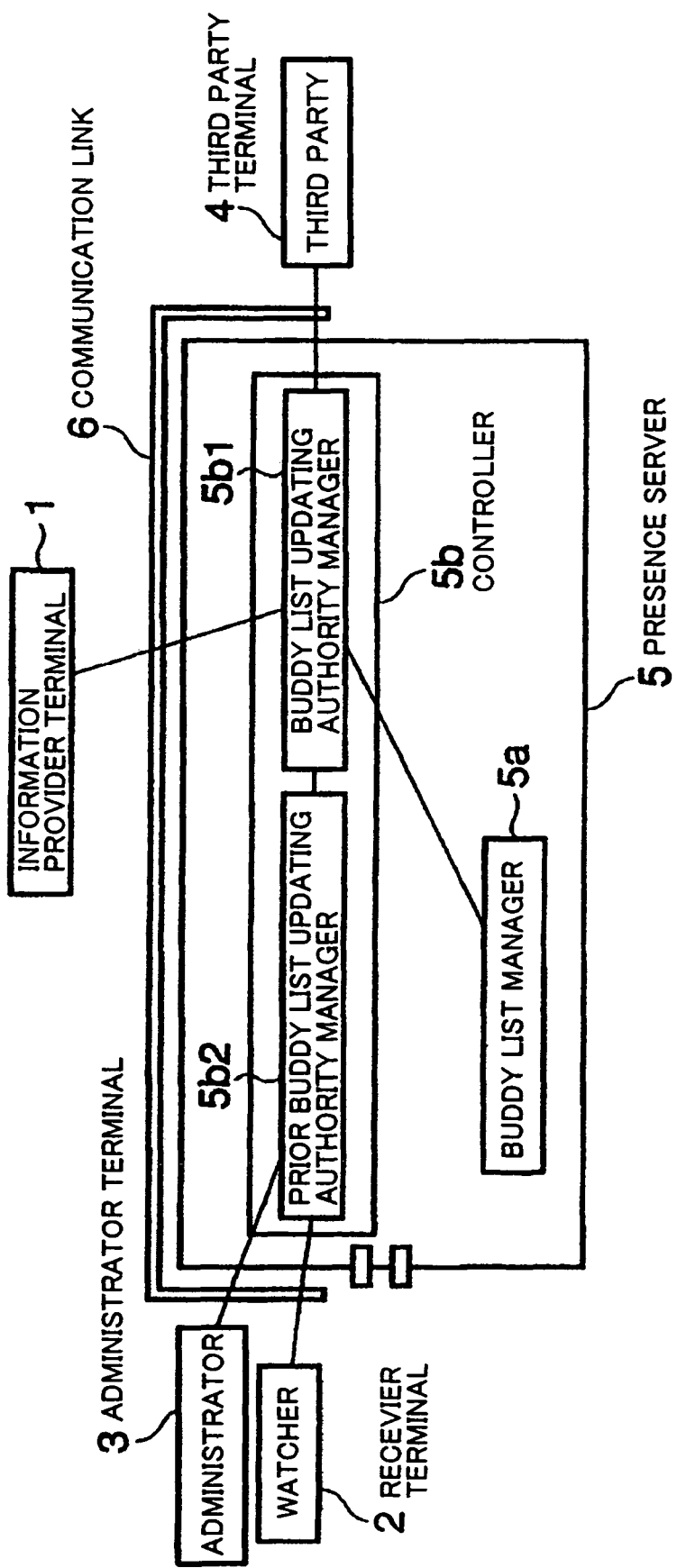
FIG. 1 is a block diagram of a list management server according to a first embodiment of the present invention.

FIG. 1 shows in block form a list management server according to a first embodiment of the present invention.

As shown in FIG. 1, the presence system, which includes the list management server, has information provider terminal 1, receiver terminal 2, administrator terminal 3, third party terminal 4, and presence server (list management server) 5.

Receiver terminal 2 is an example of a watcher or authority holder terminal.

Presence server 5 includes buddy list manager 5a and controller 5b. Controller 5b includes buddy list updating authority manager 5b1 and prior buddy list updating authority manager 5b2.

Buddy list manager 5a will be referred to simply as manager 5a. Buddy list updating authority manager 5b1 will be also referred to simply as manager 5b1. Prior buddy list updating authority manager 5b2 will be also referred to simply as manager 5b2.

In FIG. 1, in the functions of an ordinary presence service (presence system), manager 5b and manager 5b2 that have a bearing on the present invention are illustrated.

Controller 5b may be implemented by a computer. The computer reads a program that is stored in a memory and executes the program. The program enables the computer to perform a list updating process that is executed by controller 5b.

Presence server 5 is connected to information provider terminal 1, receiver terminal (watcher) 2, administrator terminal 3, and third party terminal 4 through communication link 6 such as the Internet or the like.

Information provider terminal 1 is a presentity that is used by an information provider. Information provider terminal 1 accepts information provided by the information provider and holds the accepted information.

Receiver terminal 2 is a watcher that is used by a receiver who acquires the information accepted by information provider terminal 1.

Receiver terminal 2 generates a list (hereinafter referred to as "buddy list"). The buddy list is used to distribute the information owned by information provider terminal 1 monitored by receiver terminal 2 to receiver terminal 2.

Receiver terminal 2 sends the buddy list to presence sever 5. Receiver terminal 2 may hold the buddy list.

The buddy list represents the owner of the buddy list, i.e., the watcher, and the information provider terminal that is monitored by the watcher. Receiver terminal 2 has an authority to update the buddy list generated by itself.

Administrator terminal 3 is an example of authority holder terminal. Administrator terminal 3 is used by an administrator who manages presence server 5. Administrator terminal 3 has an authority to update the buddy list.

Third party terminal 4 is used by a third party that is different from both the receiver and the administrator. Third party terminal 4 sends a request for updating the buddy list and identifying information for identifying the third party to presence server 5 through communication link 6.

Presence server 5 serves as an example of the list management server.

When presence server 5 accepts the buddy list from receiver terminal 2, presence server 5 stores the buddy list. When information provider terminal 1 that is indicated by the buddy list accepts information from the information provider, presence server 5 sends the accepted information to the owner (the watcher) of the buddy list.

Presence server 5 can update the buddy list based on an updating request that has been sent from third party terminal 4.

Manager 5a stores the buddy list that has been sent from receiver terminal 2, and manages the buddy list.

Controller 5b accepts an updating request and identifying information from the third party terminal. When controller 5b accepts an updating request and identifying information from the third party terminal, controller 5b determines whether the third party has an authority to update the buddy list or not.

If controller 5b judges that the third party has an authority to update the buddy list, then controller 5b permits the third party to update the buddy list.

Manager 5b1 is an example of updating permission unit.

Manager 5b1 is connected to third party terminal 4, manager 5b2, and manager 5a. Manager 5b1 determines whether the third party is permitted to update the buddy list or not.

When manager 5b1 accepts an updating request and identifying information from third party terminal 4, manager 5b sends the updating request and the identifying information to manager 5b2.

Manager 5b2 is an example of confirmation unit.

Manager 5b2 gives an authority to update the buddy list to receiver terminal 2 and administrator terminal 3. Manager 5b2 does not permit a terminal that is different from both receiver terminal 2 and administrator terminal 3 to update the buddy list.

When manager 5b2 accepts the updating request and the identifying information from manager 5b1, manager 5b2 asks receiver terminal 2 or administrator terminal 3 to inquire if the third party that is specified by the identifying information may update the buddy list that is designated by the updating request. Manager 5b2 accepts an answer to the inquiry, and sends the answer to manager 5b1.

Based on the answer, manager 5b1 determines whether the third party has an authority to update the buddy list or not.

Specifically, if the answer indicates that the third party is permitted to update the buddy list, then manager 5b1 judges that the third party has an authority to update the buddy list. Thereafter, manager 5b1 permits third party terminal 4 to update the buddy list.

If the answer indicates the rejection of the updating of the buddy list by the third party, then manager 5b1 judges that the third party has no authority to update the buddy list. Thereafter, manager 5b1 rejects the updating of the buddy list by third party terminal 4.

If manager 5b1 permits third party terminal 4 to update the buddy list, then manager 5b1 accepts the updating of the buddy list by third party terminal 4. Manager 5b1 sends updating details to manager 5a.

When manager 5a accepts the updating details, manager 5a updates the buddy list based on the updating details.

Manager 5a, manager 5b1, and manager 5b2 may not be included in one server, but may be components of a system that includes them.

Operation of the presence system according to the first embodiment will be described below.

Figure 2:
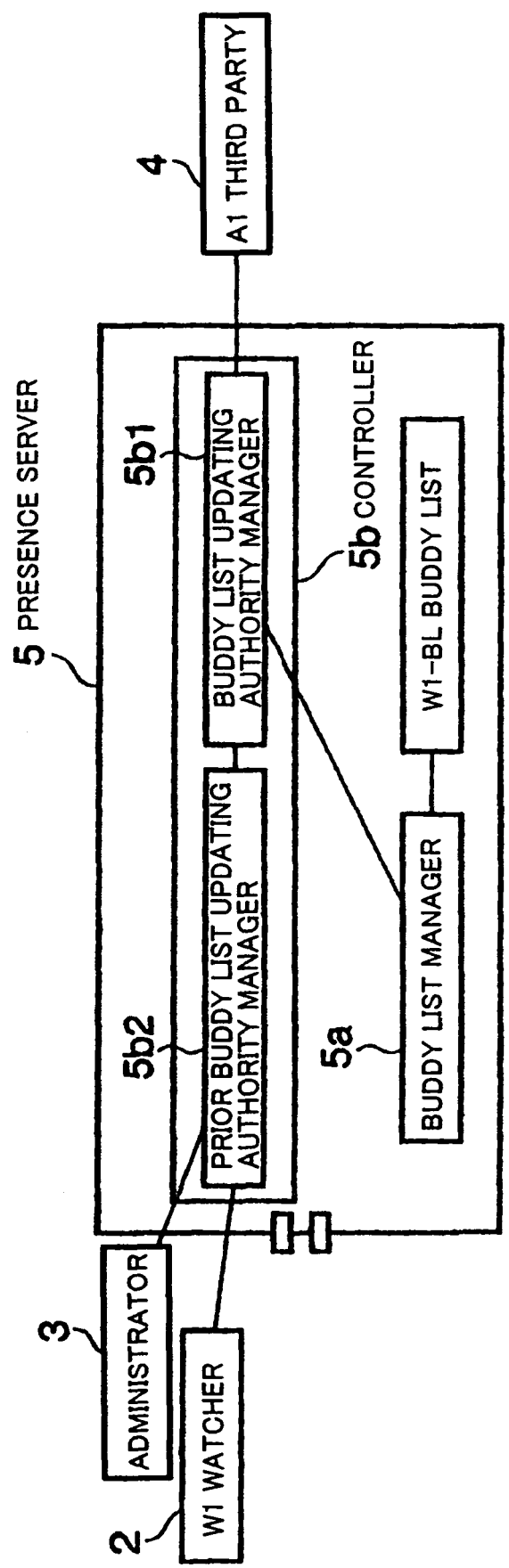
FIG. 2 is a block diagram showing the manner in which the list management server according to the first embodiment operates.

FIG. 2 shows in block form the manner in which the presence system according to the first embodiment operates.

In FIG. 2, those parts which are identical to those shown in FIG. 1 are denoted by identical reference characters. In FIG. 2, communication link 6 is omitted from illustration for the sake of brevity. Operation of the presence system will be described below with reference to FIG. 2.

It is assumed that manager 5a manages a "W1-BL buddy list" and that the "W1-BL buddy list" is a buddy list owned by "W1 watcher (receiver terminal) 2".

In step a1, A1 third party terminal 4 sends a request (updating request) for updating the "W1-BL buddy list" and identifying information of the A1 third party to manager 5b1.

When manager 5b1 accepts the request for updating the "W1-BL buddy list" and the identifying information of the A1 third party, manager 5b1 executes step a2.

In step a2, manager 5b1 sends the request for updating the 10 "W1-BL buddy list" and the identifying information of the A1 third party to manager 5b2 in order for manager 5b1 to determine whether the updating of the "W1-BL buddy list" by A1 third party terminal 4 is permitted or not.

When manager 5b2 accepts the request for updating the "W1-BL buddy list" and the identifying information of the A1 third party, manager 5b2 executes step a3.

In step a3, manager 5b2 asks W1 watcher (receiver terminal) 2 or administrator terminal 3 to inquire if the third party that is specified by the identifying information may update the buddy list ("W1-BL buddy list") that designated by the updating request.

When W1 watcher (receiver terminal) 2 or administrator terminal 3 accepts the inquiry, it executes step a4.

In step a4, W1 watcher (receiver terminal) 2 or administrator terminal 3 displays inquiry details, and then accepts an answer from the receiver or the administrator. When W1 watcher (receiver terminal) 2 or administrator terminal 3 accepts the answer from the receiver or the administrator, it executes step a5.

In step a5, W1 watcher (receiver terminal) 2 or administrator terminal 3 sends the answer to manager 5b2. When manager 5b2 accepts the answer, it executes step a6.

In step a6, manager 5b2 sends the answer to manager 5b1. When manager 5b1 accepts the answer, it executes step a7.

In step a7, if the answer indicates that the A1 third party is permitted to update the "W1-BL buddy list", then manager 5b1 judges that the A1 third party has an authority to update the "W1-BL buddy list". Thereafter, manager 5b1 permits A1 third party terminal 4 to update the "W1-BL buddy list".

If the answer indicates the rejection of the updating of the "W1-BL buddy list" by the A1 third party, then manager 5b1 judges that the A1 third party has no authority to update the "W1-BL buddy list". Thereafter, manager 5b1 rejects the updating of the "W1-BL buddy list" by A1 third party terminal 4.

If manager 5b1 permits A1 third party terminal 4 to update the "W1-BL buddy list", then manager 5b1 executes step a8.

In step a8, manager 5b1 accepts the updating of the "W1-BL buddy list" by A1 third party terminal 4, and sends updating details to manager 5a. When manager 5a accepts the updating details, it executes step s9.

In step a9, manager 5a updates the "W1-BL buddy list" based on the updating details.

The presence system according to the first embodiment offers the following advantages:

When manager 5b accepts an updating request and identifying information from third party terminal 4, manager 5b determines whether the third party has an authority to update the buddy list or not, using the identifying information. If manager 5b judges that the third party has an authority to update the buddy list, then it permits the third party to update the buddy list.

Therefore, the third party terminal, which is used by the third party having an authority to update the buddy list, is able to update the buddy list. Consequently, the possibility that the buddy list may be illegally rewritten is lowered.

Furthermore, the buddy list can be updated by third party terminal 4. It is thus possible to reduce the burden on the watcher (receiver) or the administrator in updating the buddy list.

According to the first embodiment, when manager 5b2 accepts an updating request and identifying information, manager 5b2 asks receiver terminal 2 or administrator terminal 3 to inquire if the third party specified by the identifying information may update the buddy list or not. Manager 5b2 accepts an answer to the inquiry. Based on the answer, manager 5b1 determines whether the third party has an authority to update the buddy list or not.

Accordingly, the receiver or the administrator is capable of managing the updating of the buddy list to prevent the buddy list from being illegally rewritten.

A presence system according to a second embodiment of the present invention will be described below.

Figure 3:
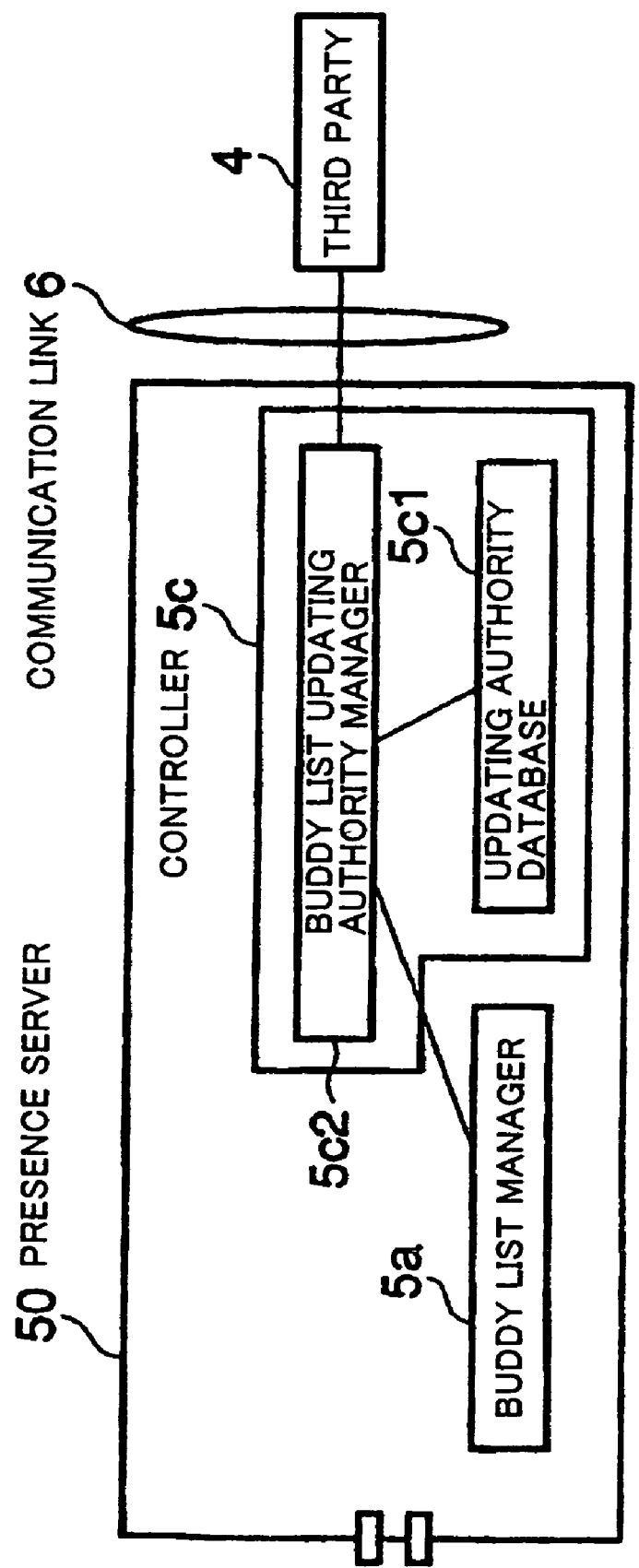
FIG. 3 is a block diagram of a list management server according to a second embodiment of the present invention.

FIG. 3 shows in block form a list management server according to a second embodiment of the present invention.

As shown in FIG. 3, the presence system, which includes the list management server, has third party terminal 4 and presence server (list management server) 50.

Presence server 50 includes manager 5a and controller 5c. Controller 5c includes updating authority database 5c1 and buddy list updating authority manager 5c2. Updating authority database 5c1 will be referred to simply as DB 5c1, and buddy list updating authority manager 5c2 as manager 5c2.

In FIG. 3, in the functions of an ordinary presence service (presence system), manager 5a that has a bearing on the present invention is illustrated.

Manager 5c2 may be implemented by a computer. The computer reads a program stored in a memory and executes the program. The program enables the computer to perform a list updating process that is executed by manager 5c2.

Presence server 50 is connected to third party terminal 4 through communication link 6 such as the Internet or the like.

Presence server 50 is an example of the list management server.

Presence server 50 stores at least a buddy list. When an information provider terminal that is indicated by the buddy list accepts information from the information provider, presence server 50 sends the accepted information to the owner (a watcher: receiver terminal) of the buddy list.

Presence server 50 is capable of updating the buddy list based on an updating request that has been sent from third party terminal 4.

Controller 5c accepts an updating request and identifying information of third party terminal 4 from third party terminal 4. When controller 5c accepts the updating request and the identifying information, controller 5c determines whether the third party has an authority to update the buddy list, using the identifying information.

If controller 5c judges that the third party has an authority to update the buddy list, then controller 5c permits the third party to update the buddy list.

DB (authority storage unit) 5c1 stores specifying information for specifying an authority owner. The authority owner has an authority to update the buddy list stored in manager 5a, and is different from both the receiver and the administrator.

DB 5c1 stores a list of third parties having an authority to update any buddy lists stored in manager 5a or conditions for specifying those third parties. DB 5c1 also stores a list of third parties having no authority to update any buddy lists stored in manager 5a or conditions for specifying those third parties. DB 5c1 stores the lists or the conditions as specifying information. A third party that is specified by the specifying information is, for example, a user who can use presence server 50.

An example of conditions for specifying third parties will be described below.

If identifying information output by third party terminal 4 is represented by a plurality of characters including a first character representative of a group to which the third party belongs, then a condition that the first character of the identifying information is a certain character is used as a condition for specifying the third party that has an authority to update any buddy lists stored in manager 5a.

If identifying information that is output by third party terminal 4 is represented by a plurality of characters that includes a first character representative of a group to which the third party belongs, then a condition that the first character of the identifying information is a certain character is used as a condition for specifying the third party that has no authority to update any buddy lists stored in manager 5a.

FIG. 4 shows an example of data stored in DB 5c1.

As shown in FIG. 4, DB 5c1 stores identifying information 5c1a of third parties that are capable of using presence server 50, and updating yes/no information 5c1b that indicates whether those third parties can update the buddy list or not. Identifying information 5c1a is related to updating yes/no information 5c1b in DB 5c1.

In FIG. 4, a third party whose identifying information 5c1a is represented by "stab" is permitted to update the buddy list, and a third party whose identifying information 5c1a is represented by "abcd" is denied the updating of the buddy list.

Referring back to FIG. 3, manager 5c2 is an example of updating permission unit.

When manager 5c2 accepts an updating request and identifying information from third party terminal 4, manager 5c2 determines whether the third party has an authority to update the buddy list or not, based on the identifying information and the identifying information stored in DB 5c1.

If the identifying information of the third party is related to updating permission (yes) information in DB 5c1, then manager 5c2 judges that the third party has an authority to update the buddy list.

If the identifying information of the third party is related to updating rejection (no) information in DB 5c1, then manager 5c2 judges that the third party has no authority to update the buddy list.

If manager 5c2 judges that the third party has an authority to update the buddy list, then manager 5c2 accepts the updating of the buddy list by third party terminal 4. Manager 5c2 sends updating details to manager 5a. When manager 5a accepts the updating details, manager 5a updates the buddy list based on the updating details.

DB 5c1, manager 5c2, and manager 5a may not be included in one server, but may be components of the presence system.

Operation of the presence system according to the second embodiment will be described below.

Figure 5:
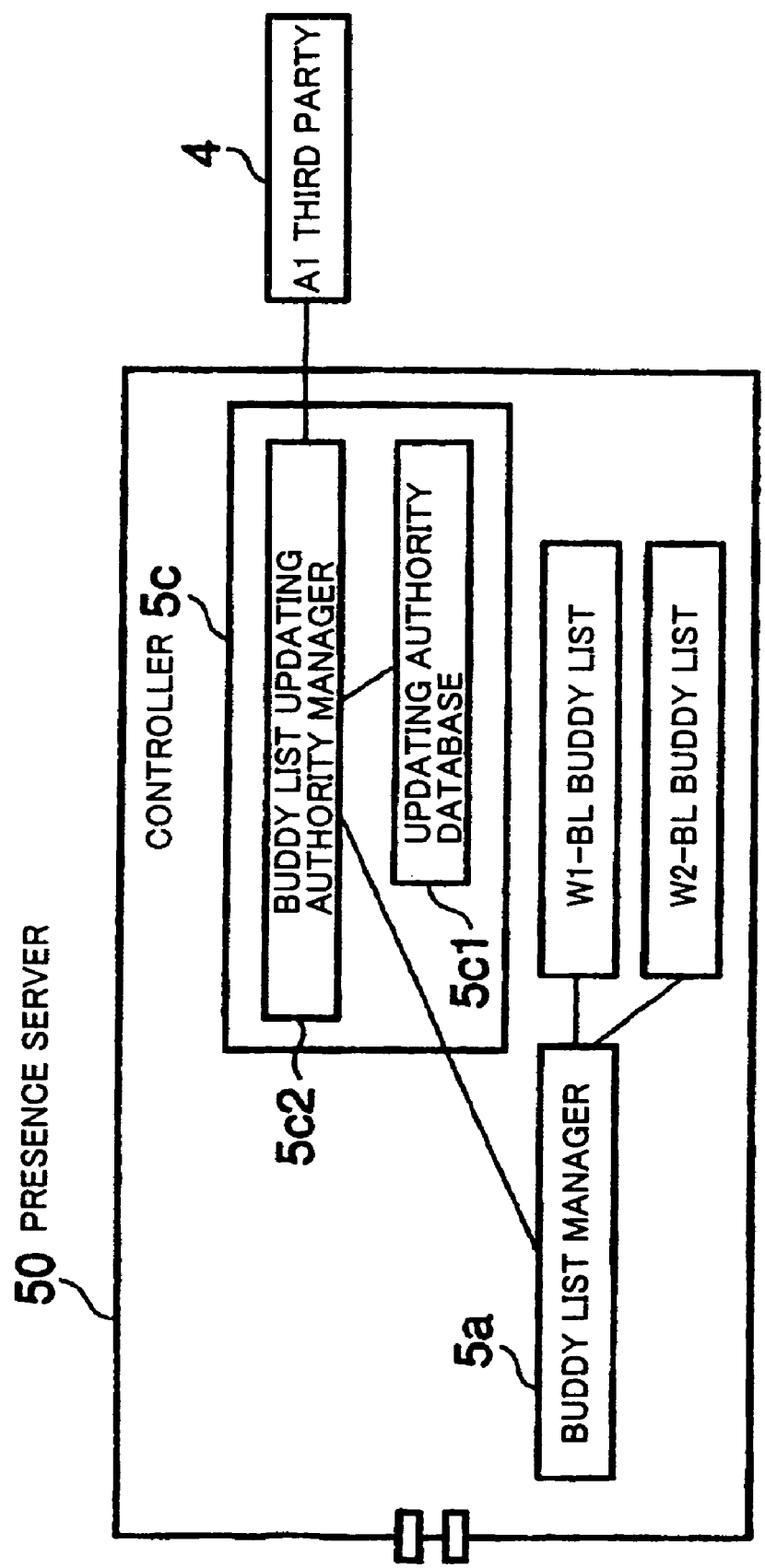
FIG. 5 is a block diagram showing the manner in which the list management server according to the second embodiment operates.

FIG. 5 shows in block form the manner in which the presence system according to the second embodiment operates.

In FIG. 5, those parts which are identical to those shown in FIG. 3 are denoted by identical reference characters. In FIG. 5, communication link 6 is omitted from illustration for the sake of brevity. Operation of the presence system will be described below with reference to FIG. 5.

It is assumed that manager 5a manages a "W1-BL buddy list" and a "W2-BL buddy list", and that a "W1 watcher (receiver terminal)" owns the "W1-BL buddy list" and a "W2 watcher (receiver terminal)" owns the "W2-BL buddy list".

It is also assumed that identifying information of the A1 third party is registered in association with updating permission (yes) information in DB5c1.

In step b1, A1 third party terminal 4 sends a request (updating request) for updating the "W1-BL buddy list" and identifying information of the A1 third party to manager 5c2.

When manager 5c2 accepts the request for updating the "W1-BL buddy list" and the identifying information of the A1 third party, manager 5c2 executes step b2.

In step b2, manager 5c2 reads updating yes/no information 5c1b related to the identifying information of third parties from DB 5c1 in order to determine whether the A1 third party is permitted to update the "W1-BL buddy list" or not.

When manager 5c2 reads updating yes/no information 5c1b, it executes step b3.

In step b3, if updating yes/no information 5c1b represents updating permission (yes) information, then manager 5c2 judges that the A1 third party has an authority to update the "W1-BL buddy list", and, as a result, permits the A1 third party to update the "W1-BL buddy list". If updating yes/no information 5c1b represents updating rejection (no) information, then manager 5c2 judges that the A1 third party has no authority to update the "W1-BL buddy list", and, as a result, inhibits the A1 third party from updating the "W1-BL buddy list".

If manager 5c2 permits the A1 third party to update the "W1-BL buddy list", then manager 5c2 executes step b4.

In step b4, manager 5c2 accepts the updating of the "W1-BL buddy list" by A1 third party terminal 4, and sends updating details to manager 5a. When manager 5a accepts the updating details, it executes step b5.

In step b5, manager 5a updates the "W1-BL buddy list" based on the updating details.

According to the second embodiment, when controller 5c accepts an updating request and identifying information from third party terminal 4, controller 5c determines whether the third party has an authority to update the buddy list or not, using the identifying information. If controller 5c judges that the third party has an authority to update the buddy list, then it permits the third party to update the buddy list.

Therefore, the third party terminal, which is used by the third party having an authority to update the buddy list, is able to update the buddy list. Consequently, the possibility that the buddy list may be illegally rewritten is lowered.

Furthermore, the buddy list can be updated by third party terminal 4. It is thus possible to reduce the burden on the watcher (receiver) or the administrator in updating the buddy list.

According to the second embodiment, furthermore, DB 5c1 stores specifying information for specifying an authority owner who has an authority to update the buddy list stored in manager 5a and who is different from both the receiver and the administrator.

When manager 5c2 accepts an updating request and identifying information, manager 5c2 determines whether the third party has an authority to update the buddy list or not, based on the identifying information and the stored specifying information. If manager 5c2 judges that the third party has an authority to update the buddy list, then manager 5c2 permits the third party to update the buddy list.

Manager 5c2 can determine whether the third party has an authority to update the buddy list or not, based on the identifying information stored in DB 5c1. Therefore, the burden on the receiver or the administrator can further be reduced.

According to the second embodiment, moreover, DB 5c1 stores updating yes/no information that represents whether each of the users that can be connected to presence server 50 has an authority to update the buddy list or not.

With the stored updating yes/no information, it is possible to set an authority owner who is capable of updating the buddy list with respect to each of the users.

The presence system according to the second embodiment may be modified as follows:

A first modification of the presence system will first be described below.

According to the first modification, if manager 5a stores a plurality of buddy lists as shown in FIG. 5, then DB 5c1 stores, with respect to each of the buddy lists, specifying information for specifying authority owners having an authority in order to update the buddy list.

Stated otherwise, DB 5c1 stores a list of third parties having an authority to update certain buddy lists managed by manager 5a or conditions for specifying those third parties. DB 5c1 also stores a list of third parties having no authority to update certain buddy lists managed by manager 5a or conditions for specifying those third parties.

Therefore, DB 5c1 stores a list of third parties having an authority to update each of the buddy lists or conditions for specifying those third parties, and also stores a list of third parties having no authority to update each of the buddy lists or conditions for specifying those third parties.

FIG. 6 shows another example of data stored in DB 5c1.

As shown in FIG. 6, DB 5c1 stores identifying information 5c1a of third parties and updating yes/no information 5c1b with respect to each of the buddy lists. Identifying information 5c1a and updating yes/no information 5c1b are related to each other in DB 5c1.

When manager 5c2 accepts an updating request for updating either one of a plurality of buddy lists and identifying information from third party terminal 4, manager 5c2 determines whether the third party has an authority to update the buddy list that is requested to be updated by the updating request, based on the identifying information and the specifying information related to the buddy list that is requested to be updated by the updating request.

If manager 5c2 judges that the third party has an authority to update the buddy list, then manager 5c2 permits third party terminal 4 to update the buddy list.

Operation of the first modification will be described below.

It is assumed that manager 5a manages the "W1-BL buddy list" and the "W2-BL buddy list" as shown in FIG. 5.

DB 5c1 stores a "W1-BL buddy list", "identifying information of the A1 third party", and "updating permission (yes) information". The "W1-BL buddy list", the "identifying information of the A1 third party", and the "updating permission (yes) information" are related to each other in DB5c1.

DB 5c1 also stores a "W2-BL buddy list", "identifying information of the A1 third party", and "updating rejection (no) information". The "W2-BL buddy list", the "identifying information of the A1 third party", and the "updating rejection (no) information" are related to each other in DB5c1.

First, operation of the presence system at the time A1 third party terminal 4 sends an updating request for updating the "W1-BL buddy list" and identifying information of the A1 third party to manager 5c2 will be described below.

In step c1, A1 third party terminal 4 sends the updating request for updating the "W1-BL buddy list" and the identifying information of the A1 third party to manager 5c2.

When manager 5c2 accepts the updating request for updating the "W1-BL buddy list" and the identifying information of the A1 third party, manager 5c2 executes step c2.

In step c2, manager 5c2 reads updating yes/no information that is related to the "W1-BL buddy list" and the "identifying information of the A1 third party" from DB 5c1 in order to determine whether the A1 third party is permitted to update the "W1-BL buddy list" or not.

Since the "W1-BL buddy list" and the "identifying information of the A1 third party" are related to the "updating permission (yes) information" in DB 5c1, manager 5c2 reads the "updating permission (yes) information".

When manager 5c2 reads the updating yes/no information, it executes step c3.

In step c3, if the updating yes/no information 5c1b represents "updating permission (yes) information", manager 5c2 judges that the A1 third party has an authority to update the "W1-BL buddy list". As a result, manager 5c2 permits A1 third party terminal 4 to update the "W1-BL buddy list". If the updating yes/no information 5c1b represents "updating rejection (no) information", manager 5c2 judges that the A1 third party has no authority to update the "W1-BL buddy list". As a result, manager 5c2 inhibits A1 third party terminal 4 from updating the "W1-BL buddy list".

If manager 5c2 permits A1 third party terminal 4 to update the "W1-BL buddy list", then manager 5c2 executes step c4.

In step c4, manager 5c2 accepts the updating of the "W1-BL buddy list" performed by A1 third party terminal 4, and sends updating details to manager 5a. When manager 5a accepts the updating details, manager 5a executes step c5.

In step c5, manager 5a updates the "W1-BL buddy list" based on the updating details.

Operation of the presence system at the time A1 third party terminal 4 sends an updating request for updating the "W2-BL buddy list" and identifying information of the A1 third party to manager 5c2 will be described below.

In step d1, A1 third party terminal 4 sends the updating request for updating the "W2-BL buddy list" and the identifying information of the A1 third party to manager 5c2.

When manager 5c2 accepts the updating request for updating the "W2-BL buddy list" and the identifying information of the A1 third party, manager 5c2 executes step d2.

In step d2, manager 5c2 reads updating yes/no information that is related to the "W2-BL buddy list" and the "identifying information of the A1 third party" from DB 5c1 in order to determine whether the A1 third party is permitted to update the "W2-BL buddy list" or not.

Since the "W2-BL buddy list" and the "identifying information of the A1 third party" are related to the "updating rejection (no) information" in DB 5c1, manager 5c2 reads the "updating rejection (no) information".

When manager 5c2 reads the updating yes/no information, it executes step d3.

In step d3, if the updating yes/no information 5c1b represents "updating permission (yes) information", manager 5c2 judges that the A1 third party has an authority to update the "W2-BL buddy list". As a result, manager 5c2 permits A1 third party terminal 4 to update the "W2-BL buddy list". If the updating yes/no information 5c1b represents "updating rejection (no) information", manager 5c2 judges that the A1 third party has no authority to update the "W2-BL buddy list".

If manager 5c2 judges that the A1 third party has no authority to update the "W2-BL buddy list", manager 5c2 executes step d4.

In step d4, manager 5c2 discards or rejects the updating request sent from A1 third party terminal 4.

According to the first modification, it is possible to set an authority owner that is capable of updating each of the buddy lists.

A second modification of the presence system will then be described below.

According to the second modification, DB 5c1 stores, with respect to each of the information provider terminals (hereinafter referred to as "buddies") contained in the buddy list, specifying information for specifying authority owners having an updating authority with respect to the buddy.

Stated otherwise, DB 5c1 stores a list of third parties having an updating authority with respect to certain buddies managed by manager 5a or conditions for specifying those third parties. DB 5c1 also stores a list of third parties having no updating authority with respect to those certain buddies or conditions for specifying those third parties.

Therefore, DB 5c1 stores, with respect to each buddy, a list of third parties having a buddy lists updating authority or conditions for specifying those third parties, and also stores, with respect to each buddy, a list of third parties having no buddy lists updating authority or conditions for specifying those third parties.

FIG. 7 shows still another example of data stored in DB 5c1.

As shown in FIG. 7, DB 5c1 stores identifying information 5c1a of third parties and updating yes/no information 5c1b with respect to each of the buddies 5c1d. Identifying information 5c1a and updating yes/no information 5c1b are related to each other with respect to each of the buddies 5c1d in DB 5c1.

When manager 5c2 accepts an updating request for updating a certain buddy and identifying information from third party terminal 4, manager 5c2 determines whether the third party has an authority to update the buddy that is indicated by the updating request, based on the identifying information and the specifying information of the buddy that is requested to be updated by the updating request.

If manager 5c2 judges that the third party has an authority to update the buddy, then manager 5c2 permits third party terminal 4 to update the buddy.

Operation of the second modification will be described below.

It is assumed that manager 5a manages the "W1-BL buddy list", and that the "W1-BL buddy list" contains a "W1-B1 buddy" and a "W1-B2 buddy".

In DB 5c1, the "W1-B1 buddy", "identifying information of the A1 third party", and "updating permission (yes) information" are related to each other, and the "W2-B1 buddy", "identifying information of the A1 third party", and "updating rejection (no) information" are related to each other.

In step e1, A1 third party terminal 4 sends the updating request for updating the "W1-BL buddy list" and the identifying information of the A1 third party to manager 5c2. It is assumed that the updating request has updating details for changing the "W1-B1 buddy" and the "W1-B2 buddy" contained in the "W1-BL buddy list".

When manager 5c2 accepts the updating request for updating the "W1-BL buddy list" and the identifying information of the A1 third party, manager 5c2 executes step e2.

In step e2, manager 5c2 reads updating yes/no information that is related to the "W1-B1 buddy" and the "identifying information of the A1 third party" from DB 5c1 in order to determine whether the A1 third party is permitted to update the "W1-B1 buddy" of the "W1-BL buddy list" or not. Since the "W1-B1 buddy" and the "identifying information of the A1 third party" are related to the "updating permission (yes) information" in DB 5c1, manager 5c2 reads the "updating permission (yes) information".

Then, manager 5c2 reads updating yes/no information that is related to the "W1-B2 buddy" and the "identifying information of the A1 third party" from DB 5c1 in order to determine whether the A1 third party is permitted to update the "W1-B2 buddy" of the "W1-BL buddy list" or not. Since the "W1-B2 buddy" and the "identifying information of the A1 third party" are related to the "updating rejection (no) information" in DB 5c1, manager 5c2 reads the "updating rejection (no) information".

In step e3, if manager 5c2 judges that the A1 third party has an authority to update the "W1-B1 buddy", manager 5c2 permits A1 third party terminal 4 to update the "W1-B1 buddy". If manager 5c2 judges that the A1 third party has no authority to update the "W1-B2 buddy", manager 5c2 inhibits A1 third party terminal 4 from updating the "W1-B2 buddy".

If manager 5c2 permits A1 third party terminal 4 to update the "W1-B1 buddy", then manager 5c2 executes step e4.

In step e4, manager 5c2 accepts the updating of the "W1-B1 buddy" performed by A1 third party terminal 4, and sends updating details to manager 5a. When manager 5a accepts the updating details, manager 5a executes step e5.

In step e5, manager 5a updates the "W1-B1 buddy" based on the updating details.

If manager 5c2 inhibits A1 third party terminal 4 from updating the "W1-B2 buddy", manager 5c2 executes step e6.

In step e6, manager 5c2 discards or rejects the updating request for updating the "W1-B2 buddy" sent from A1 third party terminal 4.

According to the second modification, it is possible to set an authority owner that is capable of updating the buddy list with respect to each of the buddies.

In the second embodiment, manager 5c2 may determine if it is possible to ascertain whether the user (third party) of third party terminal 4 has an authority to update the buddy list or not, based on the identifying information accepted from third party terminal 4 and specifying information stored in DB 5c1.

For example, if the identifying information that is sent from third party terminal 4 is stored in DB 5c1, then manager 5c2 judges that it is possible to determine whether the third party has an authority to update the buddy list. If the identifying information that is sent from third party terminal 4 is not stored in DB 5c1, then manager 5c2 judges that it is not possible to determine whether the third party has an authority to update the buddy list.

If manager 5c2 judges that it is not possible to determine whether the user of third party terminal 4 has an authority to update the buddy list, then manager 5c2 asks the authority owner terminal (receiver terminal 2 or administrator terminal 3) used by the authority owner to inquire if the user of third party terminal 4 is permitted to update the buddy list or not. Manager 5c2 accepts an answer to the inquiry.

Based on the answer, manager 5c2 determines whether the user of third party terminal 4 has an authority to update the buddy list or not.

Manager 5c2 should preferably ask manager 5b2 to send an inquiry to the authority owner terminal (receiver terminal 2 or administrator terminal 3) and to accept an answer to the inquiry.

Figure 8:
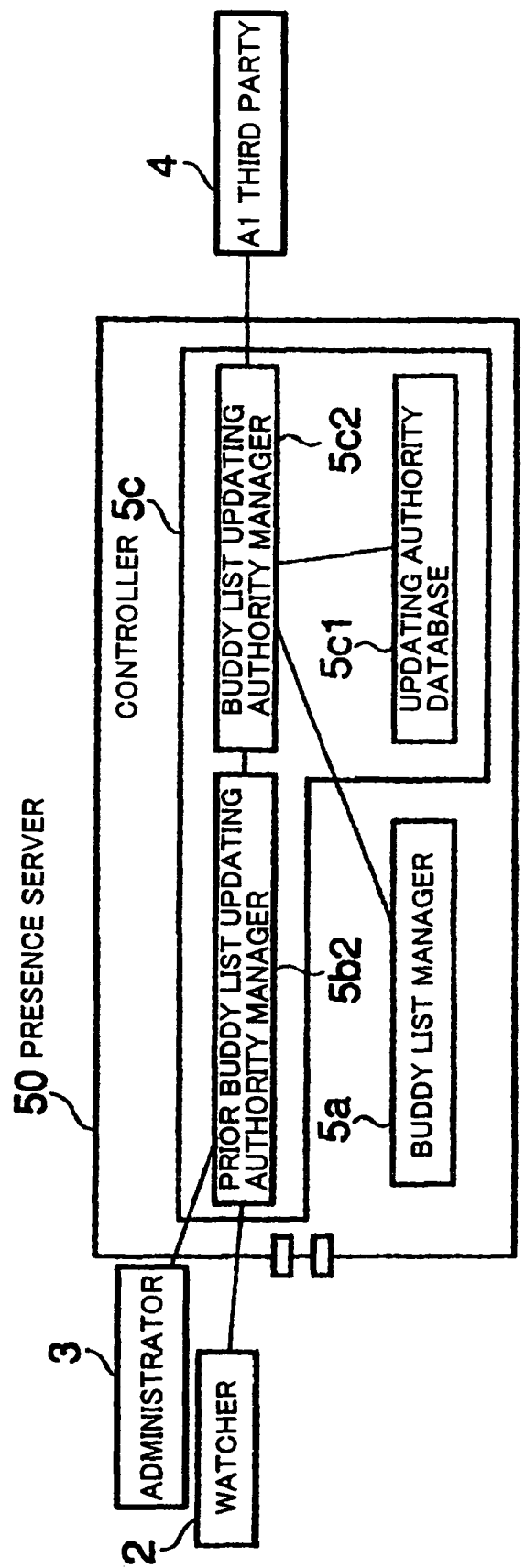
FIG. 8 is a block diagram of a modification of the list management server according to the second embodiment.

FIG. 8 shows in block form a presence system in which manager 5c2 asks manager 5b2 to send an inquiry to receiver terminal 2 or administrator terminal 3 and to accept an answer to the inquiry.

In FIG. 8, those parts which are identical to those shown in FIG. 1 or 3 are denoted by identical reference characters. In FIG. 8, controller 5c includes DB 5c1, manager 5c2, and manager 5b2.

In the second embodiment, DB 5c1 may store the specifying information shown in FIG. 4, the specifying information shown in FIG. 6, and the specifying information shown in FIG. 7. The specifying information should preferably be consistent with each other.

Manager 5c2 should preferably select or change either one of the first through third specifying information based on the updating request from third party terminal 4.

For example, if manager 5c2 judges that the updating request from third party terminal 4 is improper, e.g., the updating request requests a predetermined number of buddy lists or more to be updated, then manager 5c2 selects the specifying information shown in FIG. 4, and excludes the identifying information of third party terminal 4 from the selected specifying information.

If manager 5c2 judges that the updating request for updating buddy list A sent from third party terminal 4 is improper, e.g., the updating request for updating buddy list A is given a number of times in excess of a predetermined count within a predetermined period of time, then manager 5c2 selects the specifying information shown in FIG. 6, i.e., the identifying information that is related to buddy list A, and excludes the identifying information of third party terminal 4 from the selected specifying information.

If manager 5c2 judges that the updating request for updating buddy B sent from third party terminal 4, e.g., the updating request to remove buddy D from buddy list A, is improper, e.g., the updating request for updating buddy B is given a number of times in excess of a predetermined count within a predetermined period of time, then manager 5c2 selects the specifying information shown in FIG. 7, i.e., the identifying information that is related to buddy B, and excludes the identifying information of third party terminal 4 from the selected specifying information.

When manager 5c2 selects or changes certain specifying information from a plurality of specifying information stored in DB 5c1 based on the updating request that is sent from third party terminal 4, it is possible to respond to various updating requests from third party terminal 4.

A presence system according to a third embodiment of the present invention will be described below.

Figure 9:
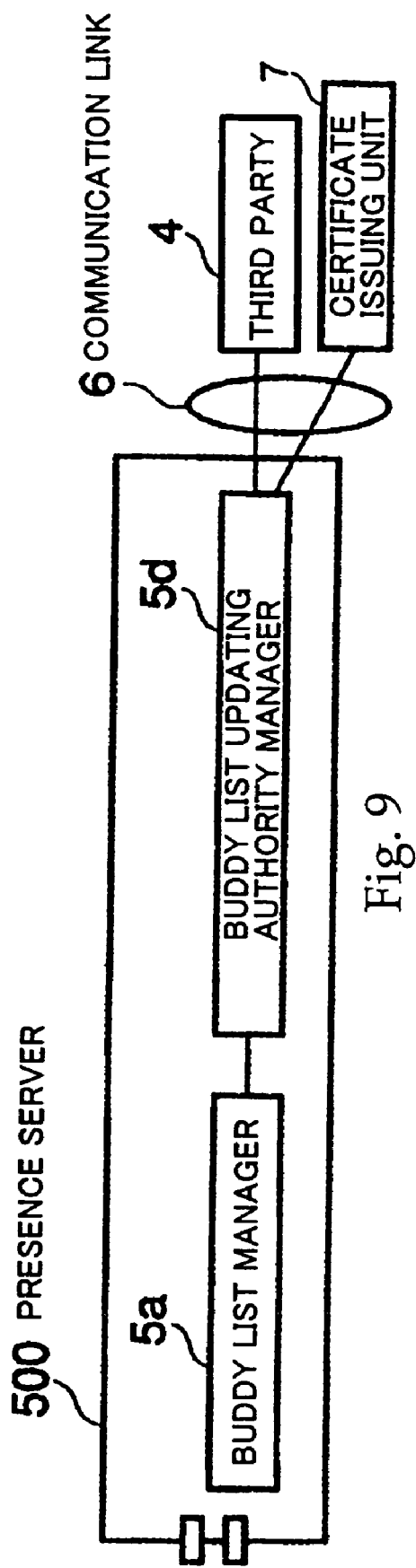
FIG. 9 is a block diagram of a list management server according to a third embodiment of the present invention.

FIG. 9 shows in block form a list management server according to a third embodiment of the present invention. In FIG. 9, those parts which are identical to those shown in FIG. 1 are denoted by identical reference characters.

As shown in FIG. 9, the presence system, which includes the list management server, has third party terminal 4, presence server (list management server) 500, and certificate issuing unit 7.

Presence server 500 includes manager 5a and buddy list updating authority manager (controller) 5d. Buddy list updating authority manager 5d will be referred to as manager 5d.

In FIG. 9, of the functions of an ordinary presence service (presence system), manager 5a that has a bearing on the present invention is illustrated.

Manger 5d may be implemented by a computer. The computer reads a program stored in a memory and executes the program. The program enables the computer to perform a list updating process that is executed by manager 5d.

Presence server 500 is connected to third party terminal 4 and certificate issuing unit 7 through communication link 6 such as the Internet or the like.

Presence server 500 is an example of the list management server.

Presence server 500 stores a buddy list. Presence server 500 sends information, which an information provider terminal (buddy) indicated by the buddy list has accepted from the information provider, to the owner (a watcher: receiver terminal) of the buddy list.

Presence server 500 is capable of updating the buddy list based on an updating request sent from third party terminal 4.

Certificate issuing unit 7 issues an updating certificate proving a buddy list updating authority of a certificate user, and also determines the validity of the updating certificate.

Manager 5d accepts an updating request and an updating certificate that indicates buddy list updating authority from third party terminal 4. The updating certificate is used as identifying information of third party terminal 4.

When manager 5d accepts the updating request and the updating certificate from third party terminal 4, manager 5d determines whether the third party has an updating authority to update the buddy list or not, using the updating certificate.

Specifically, manager 5d inquires at certificate issuing unit 7 for the validity of the updating certificate.

Then, manager 5d determines whether the third party has an updating authority to update the buddy list, based on an answer to the inquiry. For example, if manager 5d accepts an answer recognizing the validity of the updating certificate from certificate issuing unit 7, then manager 5d judges that the third party has an updating authority to update the buddy list, and, as a result, permits third party terminal 4 to update the buddy list.

Operation of the presence system according to the third embodiment will be described below.

Figure 10:
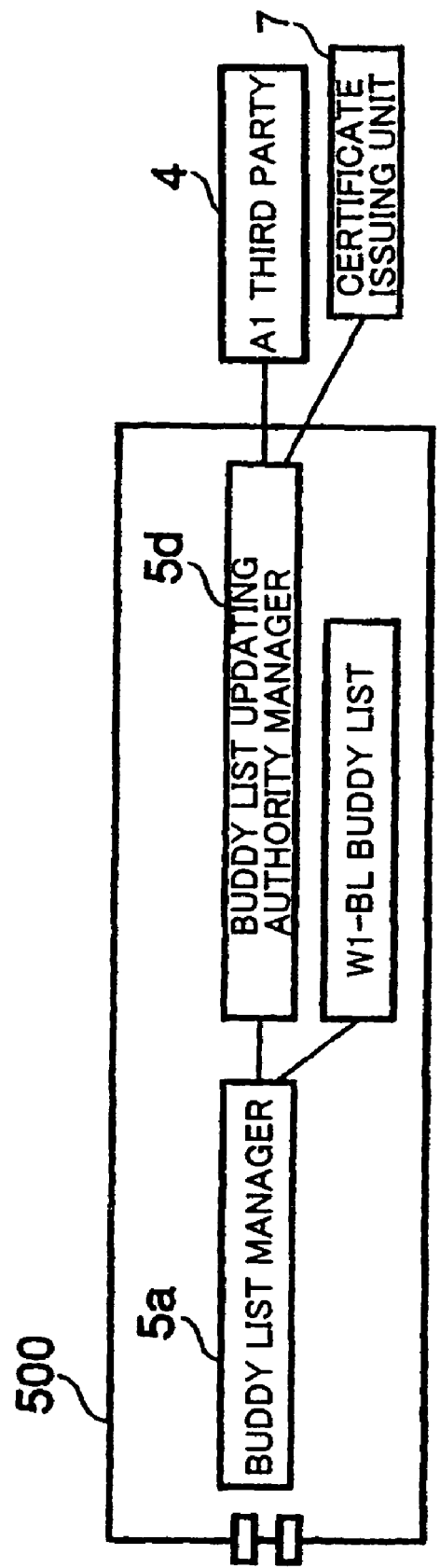
FIG. 10 is a block diagram showing the manner in which the list management server according to the third embodiment operates.

FIG. 10 shows in block form the manner in which the presence system according to the third embodiment operates.

In FIG. 10, those parts which are identical to those shown in FIG. 9 are denoted by identical reference characters. In FIG. 10, communication link 6 is omitted from illustration for the sake of brevity. Operation of the presence system will be described below with reference to FIG. 10.

It is assumed that manager 5a manages a "W1-BL buddy list" and that the owner of the "W1-BL buddy list" is a "W1 watcher (receiver terminal)".

In step f1, A1 third party terminal 4 sends a request (updating request) for updating the "W1-BL buddy list" and an updating certificate for updating the "W1-BL buddy list" issued from certificate issuing unit 7, to manager 5d.

When manager 5d accepts the updating request for updating the "W1-BL buddy list" and the updating certificate, manager 5d executes step f2.

In step f2, manager 5d inquires at certificate issuing unit 7 for the validity of the updating certificate received from A1 third party terminal 4, in order to determine whether the A1 third party is permitted to update the "W1-BL buddy list" or not.

When certificate issuing unit 7 accepts the inquiry about the validity of the updating certificate, it executes step f3.

In step f3, certificate issuing unit 7 determines the validity of the updating certificate, and sends a notice that represents the determined result to manager 5d. When manager 5d accepts the notice from certificate issuing unit 7, manager 5d executes step f4.

In step f4, if the notice indicates the validity of the updating certificate, then manager 5d judges that the A1 third party has an updating authority to update the "W1-BL buddy list", and, as a result, permits A1 third party terminal 4 to update the buddy list. If the notice does not indicate the validity of the updating certificate, then manager 5d judges that the A1 third party has no updating authority to update the "W1-BL buddy list".

If manager 5d permits A1 third party terminal 4 to update the "W1-BL buddy list", then manager 5d executes step f5.

In step f5, manager 5d accepts the updating of the "W1-BL buddy list" performed by A1 third party terminal 4, and sends updating details to manager 5a. When manager 5a accepts the updating details, manager 5a executes step f6.

In step f6, manager 5a updates the "W1-BL buddy list" based on the updating details.

According to the third embodiment, when manager 5d accepts an updating request and an updating certificate from third party terminal 4, manager 5d determines whether the third party has an updating authority to update the buddy list or not, using the updating certificate. If manager 5d judges that the third party has an updating authority, then manager 5d permits third party terminal 4 to update the buddy list.

Therefore, the third party terminal, which is used by the third party having an updating authority to update the buddy list, is able to update the buddy list. Consequently, the possibility that the buddy list may be illegally rewritten is lowered.

Furthermore, the buddy list can be updated by third party terminal 4. It is thus possible to reduce the burden on the watcher (receiver) or the administrator in updating the buddy list.

According to the third embodiment, when manager 5d accepts an updating request and an updating certificate, manager 5d inquires at certificate issuing unit 7 for the validity of the updating certificate and accepts an answer to the inquiry.

Based on the answer, manager 5d determines whether the third party has an updating authority to update the buddy list or not. If manager 5d accepts an answer that proves the validity of the updating certificate, manager 5d permits third party terminal 4 to update the buddy list.

Consequently, it is possible to determine whether third party terminal 4 has an updating authority to update the buddy list or not, based on the updating certificate.

The presence system according to the third embodiment and the presence system according to the second embodiment may be combined with each other.

For example, when the controller accepts an updating request and an updating certificate from third party terminal 4, the controller determines whether the user of third party terminal 4 has an updating authority to update the buddy list or not, based on the accepted identifying information and the specifying information stored in updating authority database 5c1.

If the controller judges that the user has an updating authority to update the buddy list, then the controller permits third party terminal 4 to update the buddy list.

If the controller is unable to determine whether the user has an updating authority to update the buddy list or not, then the controller asks receiver terminal 2 or administrator terminal 3 to inquire if the user is permitted to update the buddy list or not.

The controller accepts an answer to the inquiry. If the controller accepts an answer indicating that third party terminal 4 is permitted to update the buddy list, then the controller permits third party terminal 4 to update the buddy list.

When the controller accepts an updating request and an updating certificate from third party terminal 4, the controller inquires at certificate issuing unit 7 about whether the user of third party terminal 4 has an updating authority to update the buddy list or not.

The controller accepts an answer to the inquiry. If the validity of the updating certificate is proven, the controller judges that the user has an updating authority to update the buddy list, and permits third party terminal 4 to update the buddy list.

Thus, it is possible determine whether the third party has an updating authority to update the buddy list or not, according to either one of a plurality of decision processes. Therefore, the determination becomes accurate.

The present invention is applicable to the following fields:

(1) Advertisement and Publicity:

For example, an advertisement serves as information provided by a presentity (buddy), and the provider of the advertisement is added to a buddy list. An advertisement agent or the like updates the buddy list.

(2) TODO List:

For example, TODO serves as information provided by a presentity (buddy), and the provider of TODO is added to a buddy list. A person who wants a watcher to process TODO or the like updates the buddy list.

(3) Privacy Management:

For example, if there is an administrator for managing the privacy of a presentity, other than the presentity, then the administrator changes a buddy list in which the presentity is registered.

(4) Cellular Phone:

For example, a third party sends an updating request for updating a buddy list to a presence service, using a browser or a built-in application of a cellular phone.

While preferred embodiments of the present invention have been described using specific terms, such description is for illustrative purposes only, and it is to be understood that changes and variations may be made without departing from the spirit or scope of the following claims.

What is claimed is:

1. A list management server for adding or deleting an information provider terminal, which is monitored by a receiver terminal, in a buddy list that is used to distribute information from said information provider terminal to said receiver terminal, based on an updating request sent through a communication link from a third party terminal which is different from both said receiver terminal and an administrator terminal of an administrator of said buddy list, said server comprising:

a list storage unit for storing said buddy list; and a controller for accepting said updating request from said third party terminal and identifying information for identifying a user of said third party terminal, determining whether said user has an updating authority to update said buddy list or not, using said identifying information, and, if said controller judges that said user has an updating authority to update said buddy list, permitting said third party terminal to add or delete said information provider terminal in or from said buddy list, said controller comprising:

an authority storage unit for storing specifying information for specifying an authority holder that has an updating authority for updating the buddy list stored in said list storage unit, wherein said authority storage unit stores first specifying information indicating whether each user that is capable of using said list management server has the updating authority for updating said buddy list, second specifying information for specifying an authority holder having an updating authority for updating each of buddy lists, and third specifying information for specifying an authority holder having an updating authority for updating each of information provider terminals indicated by said buddy list; and an updating permission unit for accepting said updating request and said identifying information from said third party terminal, determining whether said user has said updating authority or not based on said identifying information and the specifying information stored in said authority storage unit, and permitting said third party terminal to add or delete said information provider terminal in or from said buddy list if said updating permission unit judges that said user has said updating authority, wherein said updating permission unit selects either one of said first specifying information, said second specifying information, and said third specifying information depending on said updating request from said third party terminal.

2. The list management server according to claim 1, wherein said specifying information comprises a condition for specifying said authority holder.

3. The list management server according to claim 1, wherein said specifying information comprises a list for specifying said authority holder.

4. The list management server according to claim 1, wherein said specifying information represents said authority holder.

5. The list management server according to claim 1, wherein said specifying information represents an updating rejected person who is denied adding or deleting said information provider terminal in or from said buddy list.

6. The list management server according to claim 1, wherein said specifying information represents said authority holder and an updating rejected person who is denied adding or deleting said information provider terminal in or from-said buddy list.

7. The list management server according to claim 1, wherein said updating permission unit determines whether said user has the updating authority for updating said buddy list based on the identifying information of the user and the specifying information stored in said authority storage unit, and, if said updating permission unit is unable to determine whether said user has the updating authority for updating said buddy list, said updating permission unit asks an authorized person terminal used by an authorized person having an updating authority for updating said buddy list to inquire if said user is permitted to update said buddy list, accepts an answer to the inquiry, and determines whether said user has the updating authority for updating said buddy list based on said answer.

8. A list managing method to be carried out by a list management server for adding or deleting an information provider terminal, which is monitored by a receiver terminal, to or from a buddy list that is used to distribute information from said information provider terminal to said receiver terminal, based on an updating request sent through a communication link from a third party terminal which is different from both said receiver terminal and an administrator terminal of an administrator of said buddy list, said list management server including a list storage unit for storing said buddy list, and an authority storage unit for storing first specifying information indicating whether each user capable of using said list management server has the updating authority for updating said buddy list, second specifying information for specifying an authority holder having an updating authority for updating each of buddy lists, and third specifying information for specifying an authority holder having an updating authority for updating each of information provider terminals indicated by said buddy list stored in said list storage unit, said list managing method comprising the steps of:

(a) accepting said updating request and identifying information for identifying a user of said third party terminal from said third party terminal, and determining whether said user has an updating authority based on said identifying information and the specifying information stored in said authority storage unit to update said buddy list;

(b) selecting either one of said first specifying information, said second specifying information, and said third specifying information depending on said updating request from said third party terminal; and (c) if it is judged that said user has an updating authority to add or delete said information provider terminal in or from said buddy list, permitting said third party terminal to update said buddy list.

9. The list managing method according to claim 8, wherein said specifying information comprises a condition for specifying said authority holder.

10. The list managing method according to claim 8, wherein said specifying information comprises a buddy list for specifying said authority holder.

11. The list managing method according to claim 8, wherein said specifying information represents said authority holder.

12. The list managing method according to claim 8, wherein said specifying information represents an updating rejected person who is denied adding or deleting said information provider terminal in or from said buddy list.

13. The list managing method according to claim 8, wherein said specifying information represents said authority holder and an updating rejected person who is denied adding or deleting said information provider terminal to or from said buddy list.

14. The list managing method according to claim 8, further comprising the steps of:

(d) determining whether said user has the updating authority for updating said buddy list based on the identifying information of the user and the specifying information stored in said authority storage unit (e) if it is impossible to determine whether said user has the updating authority for updating said buddy list, asking an authorized person terminal used by an authorized person having an updating authority for updating said buddy list to inquire if said user is permitted to update said buddy list; and (f) accepting an answer to the inquiry;

wherein said step (a) further comprises the step of determining whether said user has the updating authority for updating said buddy list based on said answer.

15. A computer readable recording medium in which a program is recorded, said program controlling a computer for adding or deleting an information provider terminal, which is monitored by a receiver terminal, to or from a buddy list that is used to distribute information from said information provider terminal to said receiver terminal, based on an updating request sent through a communication link from a third party terminal which is different from both said receiver terminal and an administrator terminal of an administrator of said buddy list, said computer being connected to a list storage unit for storing said buddy list, and an authority storage unit for storing first specifying information indicating whether each user capable of using said list management server has the updating authority for updating said buddy list, second specifying information for specifying an authority holder having an updating authority for updating each of buddy lists, and third specifying information for specifying an authority holder having an updating authority for updating each of information provider terminals indicated by said buddy list stored in said list storage unit, said program enabling said computer to perform a list management process comprising the steps of:

(a) accepting said updating request and identifying information for identifying a user of said third party terminal from said third party terminal, and determining whether said third party terminal has an updating authority based on said identifying information and the specifying information stored in said authority storage unit to update said buddy list;

(b) selecting either one of said first specifying information, said second specifying information, and said third specifying information depending on said updating request from said third party terminal; and (c) if it is judged that said user has an updating authority to update said buddy list, permitting said third party terminal to add or delete said information provider terminal in or from said buddy list.

16. The computer readable recording medium of claim 15, wherein the list management process further comprises the steps of:

(d) determining whether said user has the updating authority for updating said buddy list based on the identifying information of the user and the specifying information stored in said authority storage unit;

(e) if it is impossible to determine whether said user has the updating authority for updating said buddy list, asking an authorized person terminal used by an authorized person having an updating authority for updating said buddy list to inquire if said user is permitted to update said buddy list;

(f) accepting an answer to the inquiry; and wherein said step (a) comprising the step of determining whether said user has the updating authority for updating said buddy list based on said answer.

* * * * *